(12) United States Patent
Strasser

(10) Patent No.: US 7,534,993 B2
(45) Date of Patent: May 19, 2009

(54) POSITION-MEASURING DEVICE

(75) Inventor: Erich Strasser, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 146 days.

(21) Appl. No.: 11/540,112

(22) Filed: Sep. 29, 2006

(65) Prior Publication Data

US 2007/0075233 A1 Apr. 5, 2007

(30) Foreign Application Priority Data

Oct. 1, 2005 (DE) .................... 10 2005 047 259

(51) Int. Cl.
*G01D 5/34* (2006.01)
(52) U.S. Cl. .................. 250/231.13; 250/231.14; 250/231.15; 250/231.18
(58) Field of Classification Search .............. 250/231.13–231.18; 341/11, 13
See application file for complete search history.

(56) References Cited

U.S. PATENT DOCUMENTS

| 4,199,749 | A |   | 4/1980  | Richter |
|-----------|---|---|---------|---------|
| 4,631,519 | A |   | 12/1986 | Johnston |
| 4,712,088 | A |   | 12/1987 | Ernst |
| 4,788,422 | A |   | 11/1988 | Fujiwara |
| 5,066,857 | A | * | 11/1991 | Ernst .................... 250/231.15 |
| 6,507,188 | B1 |  | 1/2003  | Dilger et al. |

FOREIGN PATENT DOCUMENTS

| DE | 36 40 156  | 6/1987  |
| DE | 198 55 960 | 6/2000  |
| EP | 1 457 762  | 9/2004  |
| JP | 63-237616  | 10/1988 |
| JP | 11-132792  | 5/1999  |

* cited by examiner

*Primary Examiner*—Kevin Pyo
(74) *Attorney, Agent, or Firm*—Kenyon & Kenyon LLP

(57) ABSTRACT

A position-measuring device for measuring linear and/or angular positions includes at least two measuring standards on which at least one code track is applied, and includes a scanning unit for scanning the code tracks. The measuring standards are positioned with respect to each other such that at least one code track of a first measuring standard and at least one code track of a second measuring standard at least partially overlap and the position information of at least one of the code tracks is scannable by the scanning unit in the region of overlap.

14 Claims, 4 Drawing Sheets

POSITION-MEASURING DEVICE

CROSS-REFERENCE TO RELATED APPLICATIONS

The present application claims priority to Application No. 10 2005 047 259.1, filed in the Federal Republic of Germany on Oct. 1, 2005, which is expressly incorporated herein in its entirety by reference thereto.

FIELD OF THE INVENTION

The present invention relates to a position-measuring device, e.g., for measuring linear and/or angular positions.

BACKGROUND INFORMATION

Certain Position-measuring devices are described in a number of documents. They are used for measuring lengths or angles in machines and devices. Such position-measuring devices include a measuring standard, on which one or more code tracks are applied, and a scanning unit, which scans the code tracks and converts path changes and angular changes into electrical signals. In the case of an angle-measuring device, the measuring standard may be a code disk, on which the code tracks are concentrically positioned. In the case of linear measuring devices, the measuring standard may take the form of a ruler.

In addition, certain conventional position-measuring devices, e.g., angle-measuring devices, include, in addition to the code disk for measuring the rotational angle of a shaft, further code disks, with the aid of which the number of completed revolutions is measured.

These additional code disks are driven via a reduction gear that reduces the speed of the shaft in a suitable manner. Such angle-measuring devices are also referred to as multiturn rotary transducers.

Certain linear measuring devices include rulers that are subdivided into several consecutive position segments, in which the coding of the code tracks cyclically repeats in the measuring direction. In order to count the passed position segments, one or more code disks are provided which are driven via a reduction gear during the scanning of the ruler, in a manner analogous to the multiturn rotary transducer.

In order to be able to fulfill the requirements for an arrangement of a multiturn rotary transducer that is as simple and compact as possible, the scanning regions of the code tracks of the different measuring standards should be concentrated in a small space. This allows several, or even all, of the code tracks to be scanned at one location, using, in an ideal example, only one sensor component, a so-called opto-ASIC.

Japanese Published Patent Application Nos. 11-132792 and 63-237616 describe multiturn rotary transducers having a code disk for ascertaining the angular position of a shaft, as well as a further code disk for counting the completed revolutions of the shaft. The two code disks are connected via a reduction gear, and their code tracks are only scanned at one location. A disadvantage of these arrangements is that only one code disk is provided for counting the revolutions, which means that the number of countable revolutions is limited.

European Published Patent Application No. 1 457 762 describes a device for measuring the position, the displacement, or the rotational angle of an object. It includes three measuring standards in the form of three consecutive code disks, which are coupled via a differential gear unit. The code disks are scanned by a scanning unit that radially covers the code tracks of all of the code disks. A disadvantage of a device of this type is that the radiation of the illumination unit must penetrate all of the code disks to scan the outermost code track. The result of this is a high sensitivity to soiling.

SUMMARY

Example embodiments of the present invention may provide a position-measuring device having an improved arrangement of measuring standards.

A position-measuring device for measuring linear and/or angular positions may include at least two measuring standards, on each of which at least one code track is applied, as well as a scanning unit for scanning the code tracks. The at least two measuring standards are positioned with respect to each other such that at least one code track of a first measuring standard and at least one code track of a second measuring standard overlap at least partially, and that the position information of at least one of the code tracks is scannable by the scanning unit in the region of overlap.

The first measuring standard may be arranged as a first code disk having a first code track, with the aid of which the angular position of a shaft may be measured. One or more second measuring standards in the form of, for example, a second code disk having a second code track and a third code disk having a third code track are driven by the shaft via a reduction gear, so that the number of completed revolutions of the shaft may be ascertained from their angular positions.

The first measuring standard may be arranged as a ruler having a first code track, which includes consecutive code segments in the measuring direction, which are encoded in an absolute manner. Second measuring standards may be arranged as a second code disk having a second code track and a third code disk having a third code track, which are arranged in a scanning head that may be moved along the ruler, in the measuring direction. Consequently, scanning the first code track allows the position within the code segment, at which the scanning head is currently located, to be measured. The second code disk and the third code disk are driven via a reduction gear, which is dimensioned such that the number of code segments passed by the scanning head is ascertainable from the angular position of the second code disk and the third code disk.

It may be provided that the overlapping code tracks have absolute coding in the form of a pseudo-random code. The pseudo-random code may be Manchester-encoded, in which case up to 50% of the code segments are made of light-transmitting regions and a high proportion of residual light is obtainable upon overlap.

A particularly high proportion of residual light for code tracks scanned in an overlapping manner results when the first measuring standard is positioned relative to the second measuring standard such that in regions of overlapping scanning, the code segments of the code track scanned in an overlapping manner intersect as high a number as possible of code segments of the overlapping code track.

Since, in the case of an arrangement of the measuring standards as described herein, the regions in which the code tracks are scanned may be arranged side by side on a very small surface, it may be possible to scan several or, in an ideal case, all of the code tracks, using a single detector unit. An opto-ASIC may be used for this purpose.

According to an example embodiment of the present invention, a position-measuring device for measuring at least one of (a) linear and (b) angular positions includes: at least two measuring standards, each measuring standard including at least one code track; and a scanning unit adapted to scan the code tracks. The measuring standards are positioned with respect to each other such that at least one code track of a first measuring standard and at least one code track of a second measuring standard at least partially overlap and position information of at least one of the code tracks is scannable by the scanning unit in a region of overlap.

The first measuring standard may be arranged as a first code disk having a first code track, an angular position of a shaft measurable by the first code track, and the second measuring standard may be arranged as a second code disk having a second code track, a number of completed revolutions of the shaft measurable by the second code track.

The measuring standards may include an additional, second measuring standard arranged as a third code disk having a third code track, and the number of completed revolutions of the shaft may be ascertainable by combining angular positions of the second code disk and the third code disk.

The second code disk and the third code disk may be arranged in one plane.

The first measuring standard may be arranged as a ruler having a first code track having, in a measuring direction, consecutive code segments encoded in an absolute manner, and the second measuring standard may be arranged as a second code disk having a second code track, a number of code segments passed by a scanning head measurable by the second code track.

The measuring standards may include an additional, second measuring standard arranged as a third code disk having a third code track, and the number of code segments passed by the scanning head may be ascertainable by combining angular positions of the second code disk and the third code disk.

The scanning unit may include an illumination unit and a detector unit.

The detector unit may include an opto-ASIC.

The code track of the first measuring standard may include an absolute coding in the form of a pseudo-random code.

The code track of the second measuring standard may include an absolute coding in the form of a pseudo-random code.

The pseudo-random code may include a Manchester coding.

The first measuring standard may be positioned relative to the second measuring standard such that, in regions of overlapping scanning, code segments of the code track of the second measuring standard intersect as large a number of code segments of the code track of the first measuring standard as possible.

Further features and aspects of example embodiments of the present invention are described in more detail below with reference to the appended Figures.

DETAILED DESCRIPTION

Figure 1:
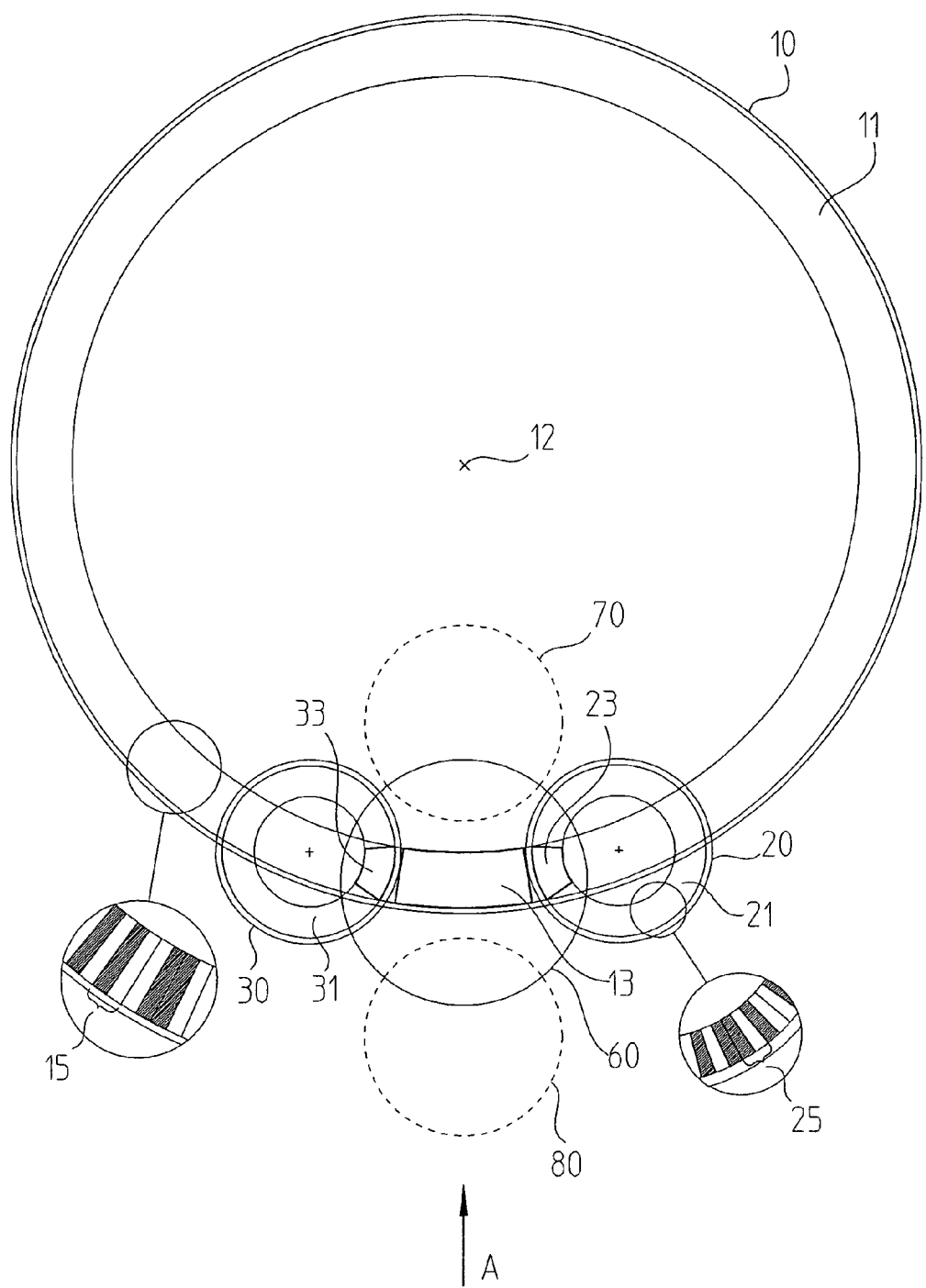
FIG. 1 is a schematic view of a position-measuring device according to an example embodiment of the present invention.

FIG. 1 is a schematic view of a position-measuring device according to an example embodiment of the present invention. It includes a first measuring standard in the form a first code disk 10, which is driven via a shaft 12. Arranged radially on first code disk 10 with respect to the center point of shaft 12 is a first code track 11, with the aid of which the angular position of first code disk 10 and, consequently, shaft 12, may be measured. A second code disk 20 having a second code track 21, and a third code disk 30 having a third code track 31, are positioned so that both second code track 21 and third code track 31 partially overlap first code track 11. Second code disk 20 and third code disk 30 are arranged second measuring standards.

Second code disk 20 and third code disk 30 are pivoted about their center points. They may be driven, for example, by shaft 12 via a reduction gear such that second code disk 20 indicates the number of completed revolutions of first code disk 10 and third code disk 30 indicates the number of completed revolutions of second code disk 20. However, they may also be coupled to shaft 12 via a differential gear unit. In both cases, the number of completed revolutions of shaft 12 is ascertainable by combining the angular positions of second code disk 20 and third code disk 30.

For clarity, a scanning unit is not illustrated in FIG. 1. Instead, the region in which the scanning of code tracks 11, 21, 31 takes place is denoted by an illumination circle 60. Produced within illumination circle 60 is a first scanning window 13 for the scanning of first code track 11, a second scanning window 23 for the scanning of second code track 21, and a third scanning window 33 for the scanning of third code track 31. As is apparent from the representation, the first code track is scanned in first scanning window 13 without overlap, whereas the scanning in second scanning window 23 and in third scanning window 33 is performed in regions, in which second code track 21 and third code track 31, respectively, overlap first code track 11. Therefore, second code track 21, as well as third code track 31, are code tracks scanned in an overlapping manner, and first code track 11 is an overlapping code track. Second scanning window 23 and third scanning window 33 are regions of overlapping scanning.

A fourth code disk 70 and a fifth code disk 80 are indicated by dashed lines. The space-saving arrangement of second code disk 20 and third code disk 30 also allows fourth code disk 70 and fifth code disk 80 to be positioned such that they may be scanned via scanning windows, within illumination circle 60. In other words, all code tracks of the five represented code disks 10, 20, 30, 70, and 80 may be scanned in a very confined space, e.g., inside illumination circle 60.

Figure 2:
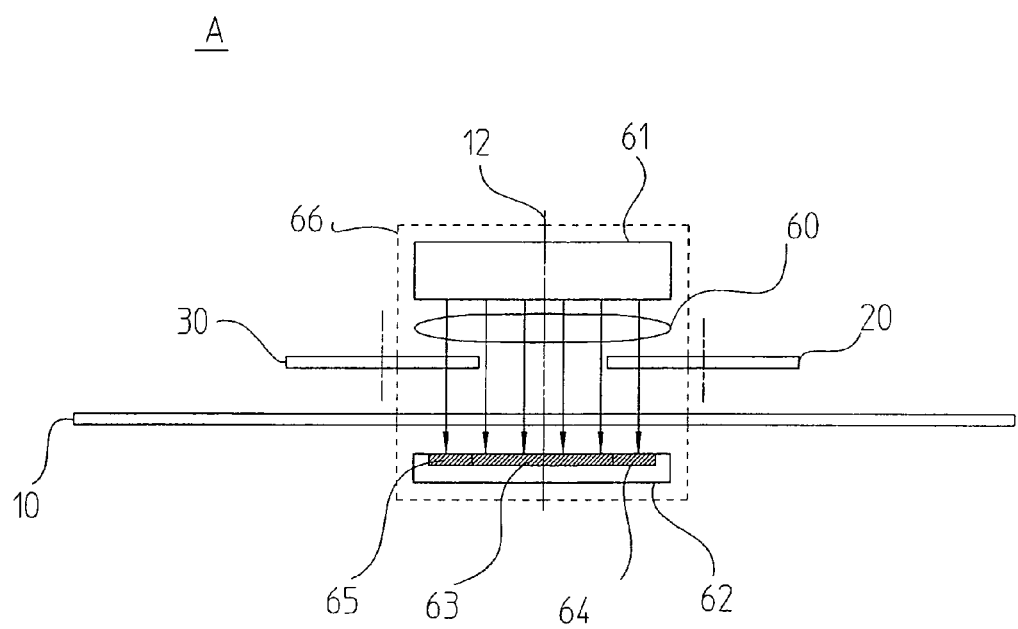
FIG. 2 is a side view of the position-measuring device illustrated in FIG. 1.

FIG. 2 is a schematic side view of the position-measuring device illustrated in FIG. 1, from the direction indicated by arrow A. In addition to the components illustrated in FIG. 1, an illumination unit 61 and a detector unit 62 for scanning the code tracks of first code disk 10, second code disk 20, and third code disk 30 are illustrated in FIG. 2. Therefore, illumination unit 61 and detector unit 62 form a scanning unit 66. Components of the position-measuring device described with reference to FIG. 1 are provided with the same reference numerals in FIG. 2.

The illustrated scanning principle is so-called transmitted-light scanning, i.e., the code disks are arranged between illumination unit 61 and detector unit 62. Illumination unit 61 directs a largely parallel bundle of light having the diameter of illumination circle 60, in the direction of the code disks. Depending on if it strikes light-transmitting or opaque code segments, the light is modulated by the code tracks and strikes sensor fields 63, 64, 65 of detector unit 62, which convert the modulated light to electric position signals and prepares it for further processing.

As illustrated in FIG. 2, second code disk 20 and third code disk 30 are arranged together in one measuring plane, while first code disk 10 is arranged on a measuring plane parallel to it. This arrangement may be particularly favorable since it may allow a small gap between illumination unit 61 and detector unit 62. In this manner, the degree of modulation of the position signals resulting from the scanning of the code tracks of second code disk 20 and third code disk 30 is only marginally affected. In addition, the space requirement is also lowered in this spatial dimension.

It should be noted that sensor fields 63, 64, 65 may include not only individual sensor elements, but also groups of sensors positioned, for example, one behind the other in the measuring direction. The number and arrangement of the sensor elements is a function of the code track to be evaluated by sensor field 63, 64, 65.

Detector unit 62 may be not formed of many discrete components, such as individual photodiodes or photodiode arrays, but rather may include a complex, application-oriented component. Such components are also referred to as opto-ASICs. In addition to the photoelectric cells, they include circuits, as well, for processing the electric position signals acquired by the photoelectric cells from the received, modulated light. Often, circuits for interpolating the position signals and for digitizing them, as well as interface modules for transmitting the position information to subsequent electronics, etc., are already integrated as well. In the described exemplary embodiment, the use of an opto-ASIC as detector unit 62 allows code tracks 11, 21, 31 to be scanned and evaluated at only one location. In addition, the arrangement of second code disk 20 and third code disk 30 allows fourth disk 70 and also fifth code disk 80 illustrated in FIG. 1 to be positioned such that code tracks on them may also be scanned by the same opto-ASIC.

In the represented example, first sensor field 63 of detector unit 62 is assigned to first scanning window 13. The light that passes through first scanning window 13 is only modulated by first code track 11 of first code disk 10. Therefore, this is not overlapping scanning. Second sensor field 64, which is assigned to second scanning window 23, and third sensor field 65, which is assigned to third scanning window 33, receive light, which is modulated by both second code track 21 and third code track 31, as well as by the code track 11 overlapping them.

Care should be taken that code tracks 21, 31 scanned in an overlapping manner are only covered by overlapping code track 11 to the extent that an unequivocal evaluation may occur at the scanning time. This means that in the scanning window, at the time of scanning, the light-transmitting code segments of code tracks 21, 31 scanned in an overlapping manner may only be covered by the opaque code segments of overlapping code track 11 to the extent that the amount of residual light allows an unequivocal evaluation. Favorable arrangement are produced when, in the scanning window, the code segments of code tracks 21, 31 scanned in an overlapping manner intersect as large a number as possible of code segments of overlapping code track 11.

Therefore, it may be provided that first code track 11 of first code disk 10, i.e., the overlapping code track, has a uniform arrangement of light-transmitting and opaque code segments over the entire circumference. This is then the case, for example, when overlapping code track 11 has incremental scale graduation marking, i.e., an evenly spaced, radial graduation-mark pattern, where the angular position is determined by counting the graduation marks passing the detector, based on a reference mark.

So-called pseudo-random codes (PRC) are also suitable for an overlapping code track 11. PRCs include an irregular sequence of light-transmitting and opaque code segments, which are positioned over the circumference of the code track such that a different, unique, serial code word is generated for each angular step, and thus, the current angular position may be determined at any time.

In order to optimize the statistical frequency of the occurrence of light-transmitting code segments, it may be provided for the PRC to additionally have Manchester coding. If, in the PRC, a logical "1" is assigned a light-transmitting code segment and a logical "0" is assigned an opaque one, the Manchester coding allows a logical "1" to be represented, for example, by a code segment, which, in the measuring direction, includes an opaque region, followed by a light-transmitting region. A logical "0" analogously includes a light-transmitting region, followed by an opaque one. The result of this is that bit sequences, which, in a PRC, would include consecutive, opaque code segments (for example, "000" in the case of the above-described assignment), also include up to 50% light-transmitting regions.

In conventional combined code tracks, there may be incremental scale graduation marking in addition to, e.g., a track coded in an absolute manner, using a pseudo-random code having Manchester coding. Such code tracks are also usable in connection with example embodiments of the present invention.

As an example of code tracks made up of a PRC having Manchester coding, segments of first code track 11 and second code track 21 are illustrated enlarged in FIG. 1. In addition, e.g., a code segment 15 of first code track 11 and a code segment 25 of second code track 21 are illustrated.

Figure 3:
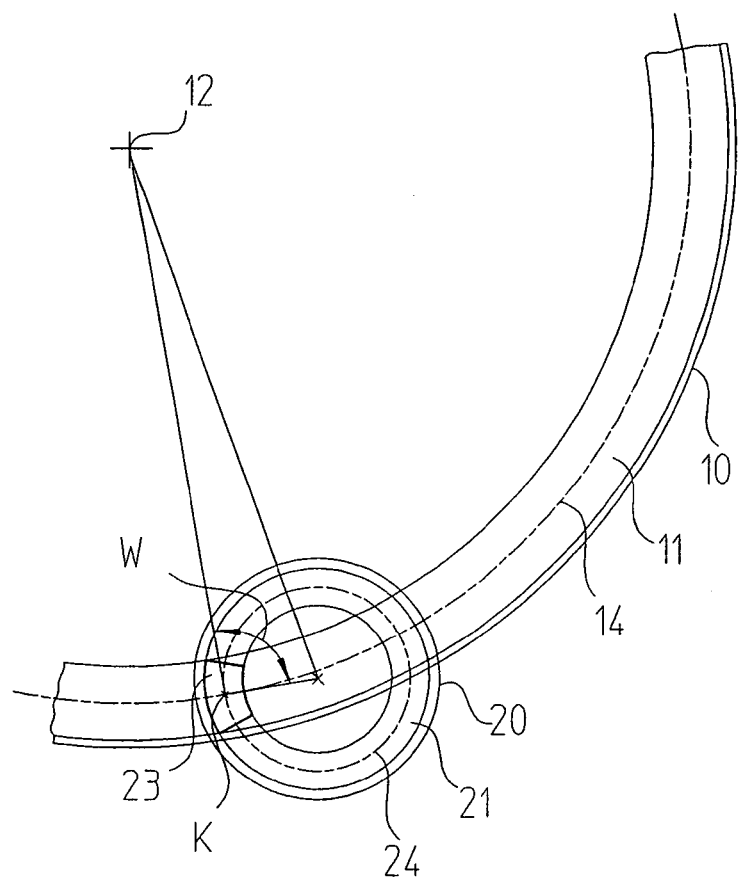
FIG. 3 illustrates an arrangements of code disks having overlapping code tracks.

FIG. 3 illustrates an example of an arrangement of two code disks having overlapping code tracks. Represented from the above-described figures are a circular segment of first code disk 10, as well as second code disk 20. A first middle circumferential line 14 is drawn into first code track 11 of first code disk 10, and a second middle circumferential line 24 is drawn into second code track 21 of second code disk 20. First middle circumferential line 14 and second middle circumferential line 24 intersect at point K. First code disk 10 is positioned with respect to second code disk 20 such that a triangle formed by the center point of shaft 12 of first code disk, the center point of second code disk 20, and point K has a right angle W at point K.

In this example, second scanning window 23, in which the overlapping scanning of second code track 21 occurs, includes a ring segment of second code track 20, which includes point K and is completely in the region of overlap of first code track 11 and second code track 21. Scanning window 23 may also be selected to be smaller or larger as a function of the layout of second code track 21. If, for example, second code track 21 is an incremental track, then a smaller, second scanning window 23 may be sufficient for the scanning. If, however, second code track 21 includes a pseudo-random code having Manchester coding, then a larger, second scanning window 23 may be required for the scanning, since more consecutive code segments may have to be detected than are included in the region of overlap. In this case, second code track 21 is only partially scanned in an overlapping manner.

Figure 4:
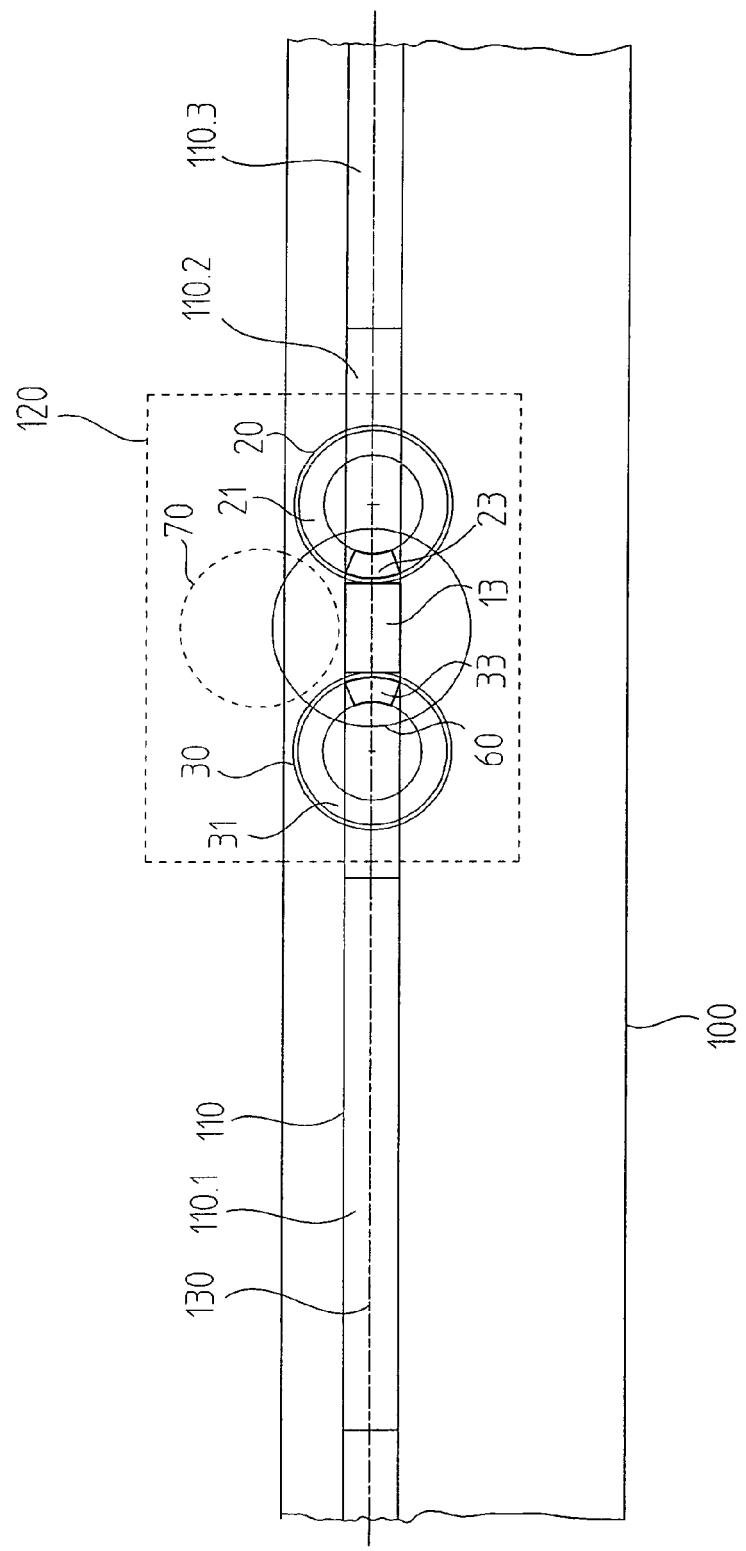
FIG. 4 is a schematic view of a position-measuring device according to an example embodiment of the present invention.

In the figures described above, the first measuring standard is formed by first code disk 10. However, FIG. 4 is a schematic view of a position-measuring device according to an example embodiment of the present invention, where the first measuring standard is a ruler 100. Components described above bear the same reference numerals and are not described in further detail. For clarity, scanning unit 66, which includes illumination unit 61 and detector unit 62, is not illustrated. Instead, scanning unit 66 is represented by illumination circle 60.

A first code track 110 is applied to ruler 100, the first code track being subdivided into a plurality of code segments 110.1, 110.2, 110.3, in which the coding of first code track 110 repeats in the measuring direction. Ruler 100 may be connected, for example, to a first object, while the scanning unit, second code disk 20, and third code disk 30 may be integrated in a scanning head 120, which is connected to a second object for measuring the travel path with respect to ruler 100. Fourth code disk 70 indicates that scanning head 120 may contain additional code disks, which are not scanned in an overlapping manner. For example, the first object may be the machining table of a machine tool, and the second object may be a tool slide.

When scanning head 120 is moved along ruler 100 in the measuring direction, second code disk 20 and third code disk 30 are driven by ruler 100 via a reduction gear such that they count the number of code segments 110.1, 110.2, 110.3 that scanning head 120 passes. The absolute position may be calculated from the distance traveled within the code segment 110.1, 110.2, 110.3 in which scanning head 120 is arranged, and from the number of passed code segments 110.1, 110.2, 110.3. In order to drive the gear, teeth, for example, may be formed on ruler 100 in the measuring direction.

Second code disk 20 and third code disk 30 may also be positioned with respect to the ruler such that the at least one code track of the ruler, and second code track 21 and third code track 31 of second code disk 20 and third code disk 30, respectively, overlap. This produces the same advantages as described above. Overlap regions may be produced in that the center points of code disks 20, 30 scanned in an overlapping manner are on center line 130 of first code track 110.

Example embodiments of the present invention are not only suitable for transmitted-light scanning, but are also suitable for reflected-light scanning. In reflected-light scanning, an illumination unit and a detector unit are on one side of the measuring standards, and the code tracks to be scanned include reflecting and non-reflecting code segments. Light that is emitted by an illumination unit in the direction of the measuring standards is diverted by the reflecting code segments of the code tracks, in the direction of the detector unit. In order to allow overlapping scanning, overlapping code tracks are arranged to transmit a part of the light emitted by the illumination unit. This may be achieved, for example, by arranging the non-reflecting code segments of the overlapping code tracks to transmit light and/or arranging the reflecting code segments to partially transmit light.

Magnetic or inductive scanning principles may also be provided in place of the above-described, optical scanning principles.

What is claimed is:

1. A position-measuring device for measuring at least one of (a) linear and (b) angular positions, comprising:
    at least two measuring standards, each measuring standard including at least one code track; and
    a scanning unit adapted to scan the code tracks;
    wherein the measuring standards are positioned with respect to each other such that at least one code track of a first measuring standard and at least one code track of a second measuring standard at least partially overlap, position information of at least one of the code tracks is scannable by the scanning unit in a region of overlap, and the position information of the at least one of the code tracks is scannable by the scanning unit independent of the overlap.

2. The position-measuring device according to claim 1, wherein the first measuring standard is arranged as a first code disk having a first code track, an angular position of a shaft measurable by the first code track, the second measuring standard being arranged as a second code disk having a second code track, a number of completed revolutions of the shaft measurable by the second code track.

3. The position-measuring device according to claim 2, wherein the measuring standards include an additional, second measuring standard arranged as a third code disk having a third code track, the number of completed revolutions of the shaft ascertainable by combining angular positions of the second code disk and the third code disk.

4. The position-measuring device according to claim 3, wherein the second code disk and the third code disk are arranged in one plane.

5. The position-measuring device according to claim 1, wherein the first measuring standard is arranged as a ruler having a first code track having, in a measuring direction, consecutive code segments encoded in an absolute manner, the second measuring standard arranged as a second code disk having a second code track, a number of code segments passed by a scanning head measurable by the second code track.

6. The position-measuring device according to claim 5, wherein the measuring standards include an additional, second measuring standard arranged as a third code disk having a third code track, the number of code segments passed by the scanning head ascertainable by combining angular positions of the second code disk and the third code disk.

7. The position-measuring device according to claim 6, wherein the second code disk and the third code disk are arranged in one plane.

8. The position-measuring device according to claim 1, wherein the scanning unit includes an illumination unit and a detector unit.

9. The position-measuring device according to claim 8, wherein the detector unit includes an opto-ASIC.

10. The position-measuring device according to claim 1, wherein the code track of the first measuring standard includes an absolute coding in the form of a pseudo-random code.

11. The position-measuring device according to claim 1, wherein the code track of the second measuring standard includes an absolute coding in the form of a pseudo-random code.

12. The position-measuring device according to claim 10, wherein the pseudo-random code includes a Manchester coding.

13. The position-measuring device according to claim 11, wherein the pseudo-random code includes a Manchester coding.

14. The position-measuring device according to claim 1, wherein the first measuring standard is positioned relative to the second measuring standard such that, in regions of overlapping scanning, code segments of the code track of the second measuring standard intersect as large a number of code segments of the code track of the first measuring standard as possible.

* * * * *